United States Patent
Dong et al.

(10) Patent No.: US 12,498,310 B2
(45) Date of Patent: Dec. 16, 2025

(54) DEVICE AND METHOD FOR MEASURING PORE SIZE DISTRIBUTION OF POROUS MEDIA THROUGH HARMONIC ANALYSIS

(71) Applicant: Xiangtan University, Xiangtan (CN)

(72) Inventors: Hui Dong, Xiangtan (CN); Fengming Tan, Xiangtan (CN); Qianfeng Gao, Xiangtan (CN); Yiyue Ma, Xiangtan (CN); Zhengdong Luo, Xiangtan (CN); Jiazhan Ren, Xiangtan (CN); Fengwen Long, Xiangtan (CN)

(73) Assignee: XIANGTAN UNIVERSITY, Xiangtan (CN)

( * ) Notice: Subject to any disclaimer, the term of this patent is extended or adjusted under 35 U.S.C. 154(b) by 242 days.

(21) Appl. No.: 18/328,985

(22) Filed: Jun. 5, 2023

(65) Prior Publication Data

US 2024/0219284 A1    Jul. 4, 2024

(30) Foreign Application Priority Data

Dec. 28, 2022    (CN) .......................... 202211727650.7

(51) Int. Cl.
G01N 15/08    (2006.01)
(52) U.S. Cl.
CPC ................ *G01N 15/0826* (2013.01)
(58) Field of Classification Search
CPC ..... G01N 15/00; G01N 15/08; G01N 15/0826
See application file for complete search history.

(56) References Cited

U.S. PATENT DOCUMENTS

| | | | |
|---|---|---|---|
| 10,260,300 B2 * | 4/2019 | Dorovsky | G01N 15/08 |
| 2022/0236226 A1 * | 7/2022 | Liu | G01N 33/24 |

OTHER PUBLICATIONS

Chinese Application No. 2022117276507, Notice of First Office action, dated May 30, 2025, 9 pages.
Chinese Application No. 2022117276507, Retrieval Report—First search dated May 24, 2025 5 pages.
Horoshenkov et al., "Pade' approximants for the acoustical properties of rigid frame porous media with pore size distributions", J. Acoust. Soc. Am Jun. 5, 1998, vol. 104, Issue 3, 12 pages.
Womersley, "XXIV. Oscillatory motion of a viscous liquid in a thin-walled elastic tube-I: The linear approximation for long waves", Dublin Philosophical Magazine and Journal of Science, dated Jun. 30, 2010, vol. 46, Issue 373, 25 pages.

* cited by examiner

*Primary Examiner* — Nguyen Q. Ha
(74) *Attorney, Agent, or Firm* — Kilpatrick Townsend & Stockton LLP

(57) ABSTRACT

Provided are a device and a method for measuring pore size distribution of porous media through a harmonic analysis. The device includes a signal application system, instruments for measuring pressure and displacement, a signal processing instrument and a sample and fluid storage container. According to the disclosure, an oscillating flow is applied to a sample through the signal application system, pressure and displacement signals are collected by the signal processing instrument, a harmonic analysis is performed on the signals, and a frequency response of admittances of the porous media is calculated according to harmonic analysis results of the signals, so that the pore size distribution is obtained.

10 Claims, 8 Drawing Sheets

DEVICE AND METHOD FOR MEASURING PORE SIZE DISTRIBUTION OF POROUS MEDIA THROUGH HARMONIC ANALYSIS

CROSS-REFERENCE TO RELATED APPLICATIONS

This disclosure claims priority to Chinese Patent Application No. 202211727650.7, filed on Dec. 28, 2022, the contents of which are hereby incorporated by reference.

TECHNICAL FIELD

The disclosure relates to the technical field of pore size distribution measurement of porous media, and in particular to a device and a method for measuring pore size distribution of porous media through a harmonic analysis.

BACKGROUND

Natural porous materials widely exist in sedimentary rocks, volcanic rocks, plants and any form of organic matter, and are widely used and studied in fields of earth science, chemistry, biology and medicine. Pore size distribution of porous materials directly affects permeability characteristics of the materials, and then has a significant impact on migration and diffusion of pollutants in soil, a stability of soil seepage, benefits of oil exploitation, an ion exchange efficiency of chemical reactors and even an applicability of human organ prostheses. Therefore, measurement of the pore size distribution of the porous materials is of great significance to various production practices.

At present, commonly used methods for measuring the pore size distribution include a mercury intrusion method, a gas adsorption method and a thermal porosity method, etc. Principles of these methods are to measure pore sizes based on a mercury injection pressure, a liquid volume of adsorbate and a liquid phase transition threshold respectively. All of these methods have some disadvantages in varying degrees, such as a too long measurement duration, damage risks of samples, a high instrument cost and environmental pollution.

SUMMARY

An objective of the disclosure is overcome shortcomings of the prior art and provide a device and a method which are safe, efficient and may accurately measure pore size distribution of porous media.

The objective of the disclosure is achieved through a following technical scheme.

A device for measuring pore size distribution of porous media through a harmonic analysis includes a sample and fluid storage container, where the sample and fluid storage container includes an upstream chamber 1 and a downstream chamber 4, a sample 5 to be tested is placed between the upstream chamber 1 and the downstream chamber 4, the upstream chamber 1 and the downstream chamber 4 are respectively connected with two detection ends of a pressure sensor 34, and a valve 28 connected in parallel with the pressure sensor 34 is also arranged between the upstream chamber 1 and the downstream chamber 4. The device also includes a harmonic analysis component 9 connected to the upstream chamber 1, where the harmonic analysis component 9 includes a signal application system and a displacement sensor, and the displacement sensor and the pressure sensor are respectively connected with two independent transfer function analyzers 44.

A Newtonian fluid is stored in the upstream chamber 1 and the downstream chamber 4.

The harmonic analysis component 9 includes a first frequency (i.e., low-frequency) harmonic analysis component for measuring pore size distribution with pore sizes larger than 500 μm and/or a second frequency harmonic (i.e., high-frequency) analysis component for measuring pore size distribution with small pore sizes larger than 30 μm.

The harmonic analysis component 9 uses a linear variable differential transformer (LVDT) 29 or a photodiode 42 as a displacement sensor, and the LVDT 29 or the photodiode 42 and the pressure sensor 34 are respectively connected with two identical but independent transfer function analyzers 44.

The first frequency harmonic analysis component includes a cam mechanism 25 fixed on a fixed seat, a connecting rod shaft support 16, a connecting rod shaft 18, a connecting rod 17, a piston 6, a piston guide plate 11, a spring 14 and an adapter 7, where the connecting rod 17 is swingably connected on the connecting rod shaft support 16 through the connecting rod shaft 18 arranged at a top, the cam mechanism 25 is in contact transmission with a bottom of the connecting rod 17, and the connecting rod 17 is fixed on the connecting rod shaft support 16 through the connecting rod shaft 18. One side in a middle section of the connecting rod 17 is connected with the piston 6, and an other side is connected with the LVDT 29. The piston 6 is connected with the spring 14 through the piston guide plate 11, and the spring 14 is connected with the upstream chamber 1 through the adapter 7.

The second frequency harmonic analysis component includes a vibrating pot 35 fixed on a fixed seat, a square bracket 2, a piston 37, an illuminating lamp 43, a photodiode 42 and an adapter 7, where one or more of the piston 37, the illuminating lamp 43, the photodiode 42 and the adapter 7 are fixed on the square bracket 2, and the upstream chamber and the harmonic analysis component are fixed on both sides of the square bracket respectively. The vibrating pot 35 drives the piston 37 to move, and the piston 37 is connected with the upstream chamber 1 through the adapter 7, and the illuminating lamp 43 for detecting a movement and a displacement of the piston 37 and the photodiode 42 as the displacement sensor are also arranged.

A method for measuring pore size distribution of porous media through a harmonic analysis includes following steps:

step A, selecting appropriate device components, connecting a sample, saturating the sample, checking the sample whether there are bubbles, and turning on an instrument;

step B, connecting two capillaries with different diameters successively according to a method in the step A, debugging the instrument, performing an FFT (fast Fourier transform) analysis on collected pressure and displacement signals by using transfer function analyzers, and calculating and obtaining a transfer function $H_M(\omega)$ required for measuring admittances by combining theoretical admittances; and step C, connecting a sample of porous media according to the method in the step A, collecting and processing the pressure and displacement signals in a testing process according to a method in the step B, and calculating the admittances of the porous media, thereby obtaining the pore size distribution.

In the step A, an experimental device is required to be filled with a fluid from a joint between a piston and an upstream chamber to an outlet hole before the testing process, and different harmonic analysis components are used to measure the pore size distribution of different pore sizes.

The step B specifically includes following steps:
(1) connecting the two capillaries with different diameters successively for the testing process, turning on the instrument, and generating signals by using an actuator and applying an oscillating flow;
(2) calibrating a sensor;
(3) collecting the pressure and displacement signals of the two capillaries with different diameters respectively, and performing the harmonic analysis on the signals; and
(4) substituting analysis results of two groups of pressure and displacement signals and the theoretical admittances of two measured capillaries into an admittance calculation formula, and inverse calculating the transfer function $H_M(\omega)$ required for measuring the admittances of the porous media, where the $H_M(\omega)$ measured by the two capillaries should be the same.

The step C specifically includes following steps:
(1) connecting the porous media, turning on the instrument, and generating the signals by using the actuator and applying the oscillating flow;
(2) collecting the pressure and displacement signals of the porous media, and performing the harmonic analysis on the signals; and
(3) substituting the analysis results of the pressure and displacement signals of the porous media and the transfer function $H_M(\omega)$ measured in the step B into the admittance calculation formula to obtain a total admittance of the measured porous media, and obtaining the pore size distribution of the porous media according to the total admittance and theoretical admittances of basic capillaries.

When the harmonic analysis component is the first frequency harmonic analysis component, the harmonic analysis component is used for measuring the pore size distribution with the pore sizes greater than 500 μm. The first frequency harmonic analysis component uses the cam mechanism to form the actuator. The cam mechanism is in contact with the connecting rod, and the connecting rod is fixed on the connecting rod shaft support through the connecting rod shaft, a right side on an upper part of the connecting rod is connected with the piston, a left side is connected with the displacement sensor LVDT, the piston is connected with the spring through the piston guide plate, and the spring is connected with the upstream chamber through the adapter.

When the harmonic analysis component is the second frequency harmonic analysis component, the pore size distribution with the small pore sizes larger than 30 μm may be measured. The second frequency harmonic analysis component uses the vibrating pot to form the actuator, and the piston is connected between the vibrating pot and the square bracket. One side of a gap where the piston is located is equipped with the illuminating lamp, and one side is equipped with the photodiode as the displacement sensor. The piston is connected with the upstream chamber through the adapter.

The disclosure has beneficial effects as follows.

The disclosure overcomes shortcomings of common methods for measuring the pore size distribution, such as a high instrument cost, a long measuring duration, sample damages and generation of toxic substances during a measurement process. A method of applying the oscillating flow to the porous media and the harmonic analysis of signals to measure the pore size distribution is safe and efficient, and may accurately reflect size distribution of most pore sizes. Therefore, the method is of great practical significance for deeply understanding pore structures of the porous media and evaluating permeability of the porous media.

BRIEF DESCRIPTION OF THE DRAWINGS

In order to more clearly explain embodiments of the disclosure or technical schemes in the prior art, drawings needed to be used in a description of the embodiments or the prior art may be briefly introduced below. Obviously, the drawings in the following description are only some embodiments of the disclosure, and other drawings may be obtained by ordinary people in the field without paying a creative labor.

DETAILED DESCRIPTION OF THE EMBODIMENTS

Figure 1:
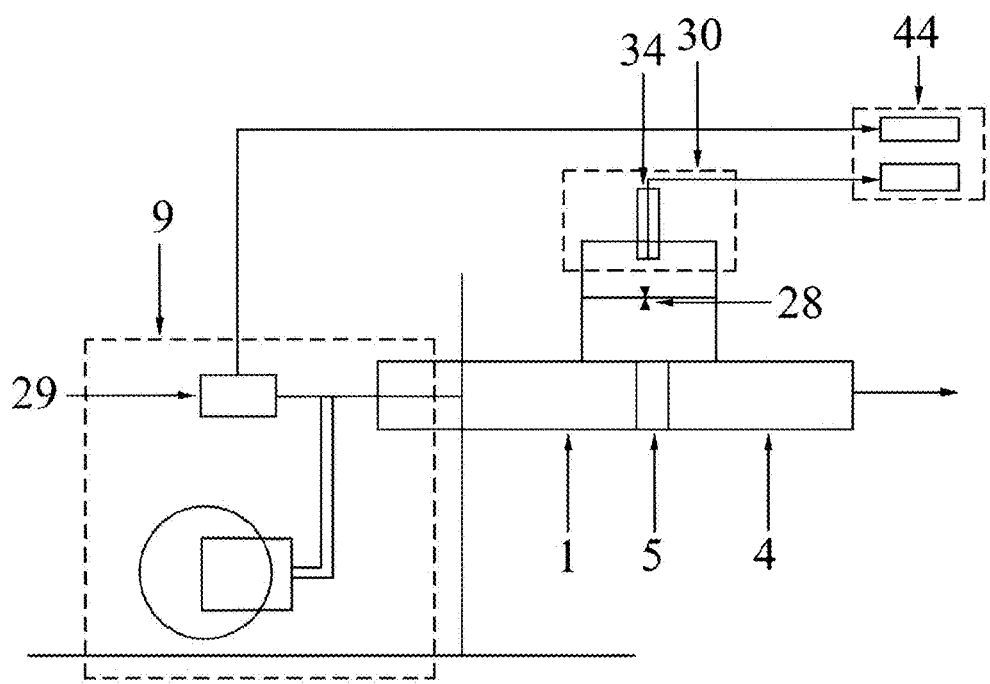
FIG. 1 is an overall schematic diagram of the disclosure.

Technical schemes of the disclosure may be further described in detail with reference to attached drawings, but a protection scope of the disclosure is not limited to the following. Any feature disclosed in this specification (including any appended claims, abstract and drawings) may be replaced by other equivalent or similar substitute features unless otherwise specified. That is, unless otherwise stated, each feature is just one example in a series of equivalent or similar features.

In the following, the technical schemes in embodiments of the disclosure may be clearly and completely described with reference to the attached drawings. Obviously, the described embodiments are only a part of the embodiments of the disclosure, but not all embodiments. Based on the embodiments in the disclosure, all other embodiments obtained by ordinary technicians in the field without a creative work belong to the protection scope of the disclosure.

Before describing the embodiments, some necessary terms need to be explained as follows.

If the terms "first" and "second" appear in this disclosure to describe various elements, these elements should not be limited by these terms. These terms are only used to distinguish one element from another. Therefore, a "first" element discussed below may also be called a "second" element without departing from teaching of the disclosure. It should be understood that when an element is referred to as "connected" or "coupled" to an other element, the element may be directly connected or directly coupled to the other element or an intervening element may be present. Conversely, when an element is referred to as "directly connected" or "directly coupled" to an other element, there is no intervening element. The terms "installation", "connection" and "connection" should be understood broadly, for example, the terms may be understood as fixed connection, detachable connection or integrated connection, or may be understood as mechanically connected, electrically connected or communicated with each other, or may be understood as directly connected or indirectly connected through an intermediary, or an internal connection of two elements or an interaction between two elements. For those skilled in the art, specific meanings of the above terms in the disclosure may be understood according to specific situations.

Various terms appearing in this disclosure are only for a purpose of describing specific embodiments and are not intended as limitations of the disclosure. Unless a context clearly indicates otherwise, a singular form is intended to include a plural form. The terms "upper", "lower", "side", "inner", "outer", "top", "bottom", "left" and "right" indicate orientation or positional relationships based on installation. The terms are only for a convenience of describing the disclosure and simplifying description, and do not indicate or imply that a referred device or element must have a specific orientation, be constructed and operated in a specific orientation. Therefore, the terms may not be understood as a limitation of the disclosure.

When the terms "including" and/or "having" are used in this specification, these terms specify a presence of said features, integers, steps, operations, elements and/or components, but do not exclude the presence and/or an addition of one or more other features, integers, steps, operations, elements, components and/or groups thereof.

Referring now to FIG. 1, a device for measuring pore size distribution of porous media through a harmonic analysis includes an upstream chamber 1, where a left side of the upstream chamber 1 is connected with a harmonic analysis component 9, a sample 5 to be tested of the porous media is placed between the upstream chamber 1 and a downstream chamber 4, and the upstream chamber 1 and the downstream chamber 4 are externally connected with an inductive thin film sensor 34. A sensor housing 45 is sleeved outside the inductive thin film sensor 34, and two ends of the inductive thin film sensor 34 are also connected with a valve 28, that is, a zero-clearing valve 28 connected in parallel with a pressure sensor 34 is also arranged between the upstream chamber 1 and the downstream chamber 4, which is beneficial to zero a value in an initial detection state. The inductive thin film sensor 34 and a displacement sensor linear variable differential transformer (LVDT) 29 or a photodiode 42 are connected with transfer function analyzers 44. The transfer function analyzers 44 are devices for collecting pressure and displacement signals and performing an FFT (fast Fourier transform) analysis, that is, a harmonic analysis, and generating FFT images. In this embodiment, a model of the inductive thin film sensor 34 is dp103, a model of a piston is D6_v2, a model of an adapter is 1-4G D10, a model of a plugging material 12 is METC6-10-16, a model of a plugging material 13 is METC10-16-8, a model of a cylindrical spiral spring is R203104, a model of a scroll bar is W1-1, a model of a rolling bearing is d8D22b7, a model of a rotating shaft is D8, a model of a flange is DCTH300, a model of a pull rod is DCTH300, a model of a base is DCTH300, a model of a screw is CHC M6L12, a model of the transfer function analyzers is SOLARTON 1250A.

Figure 2:
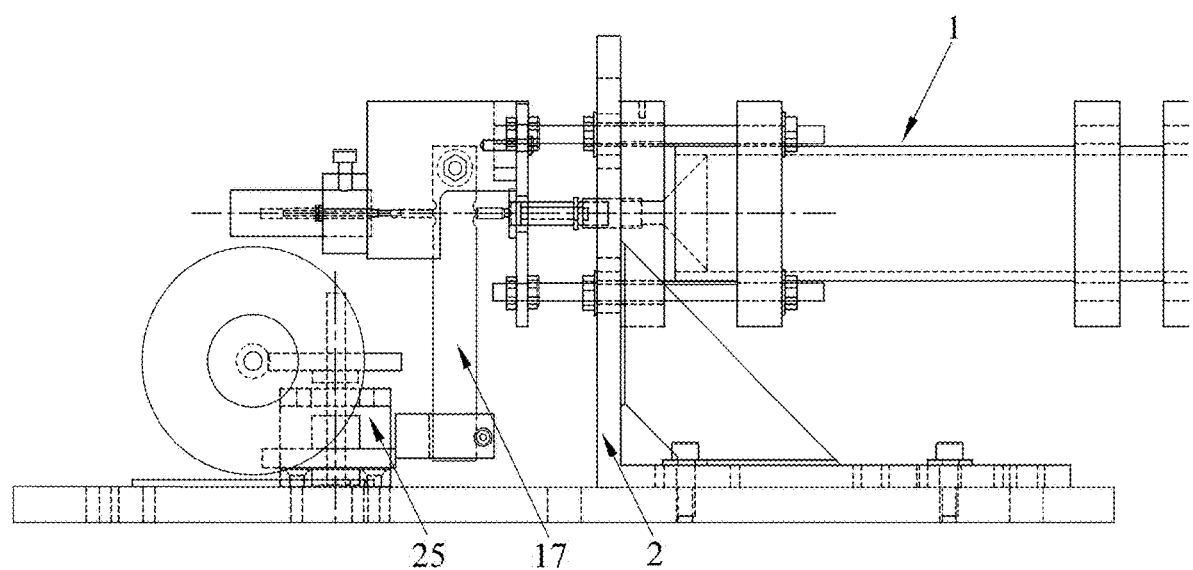
FIG. 2 is a schematic front view of a low-frequency harmonic analysis device according to the disclosure.
Figure 3:
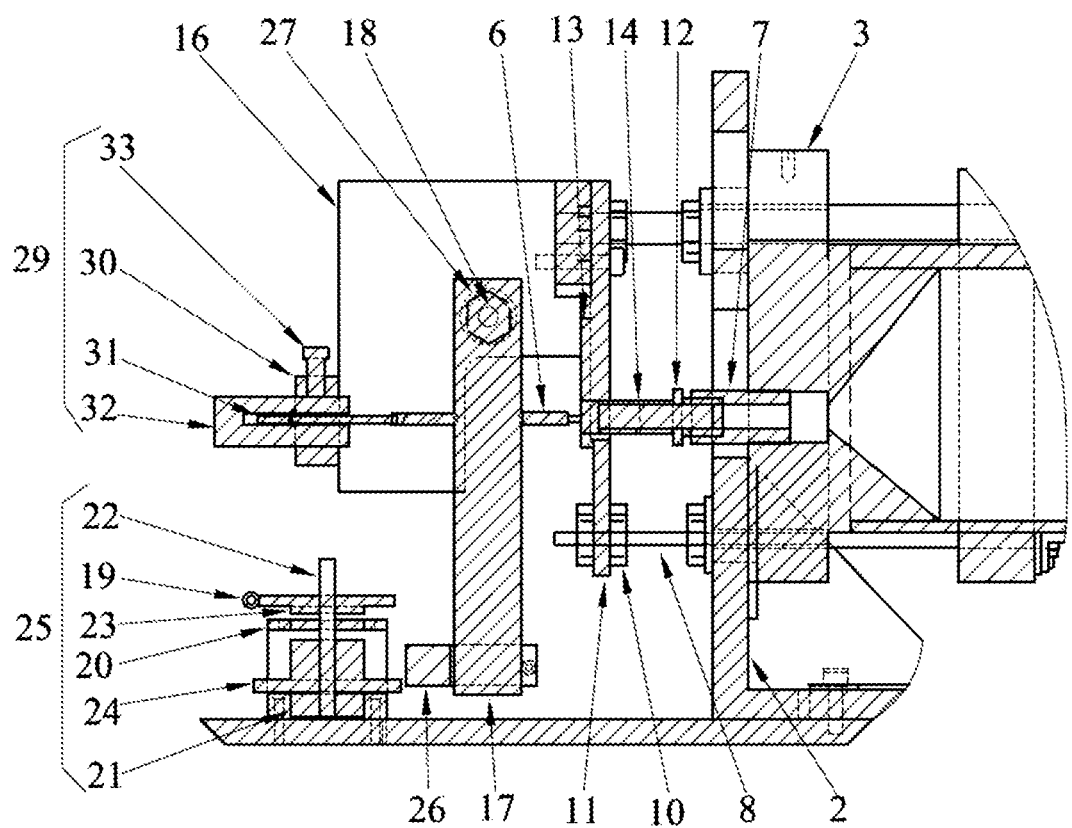
FIG. 3 is an enlarged schematic view of a harmonic analysis component in FIG. 2.
Figure 4:
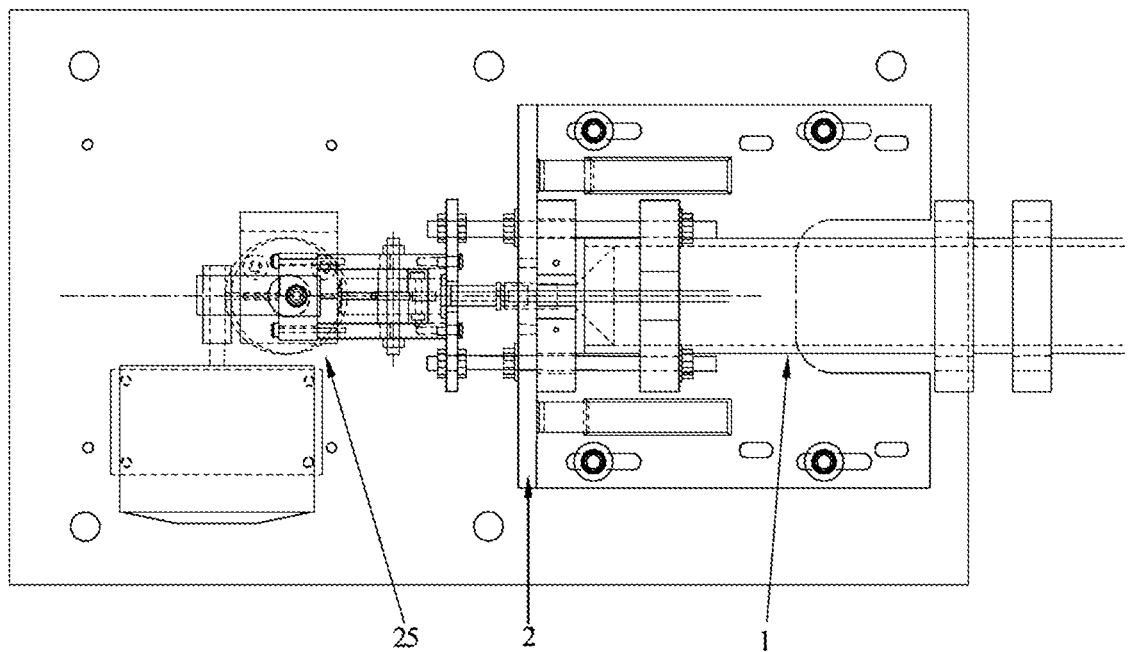
FIG. 4 is a schematic diagram of a top surface of a low-frequency harmonic analysis device according to the disclosure.

With reference to FIG. 2, FIG. 3 and FIG. 4, the harmonic analysis component 9 and the upstream chamber 1 are respectively fixed on a left side and a right side of a square bracket 2, and an upstream cap 3 is arranged on an upper part of the upstream chamber 1 near the square bracket 2. The upstream chamber 1 is communicated with the harmonic analysis component 9 through an adapter 7, and a left side of the adapter 7 is connected with a cylindrical spiral spring 14, and a plugging material METC6-10-16 and a plugging material METC10-16-8 are arranged at both ends of the cylindrical spiral spring 14. A plugging material 13 is connected with a piston 6, and the piston 6 is fixed on a piston guide plate 11, and the piston guide plate 11 is fixedly connected through four groups of bolts 8 and nuts 10. A connecting rod shaft support 16 is welded on a left side of the piston guide plate 11, where an inside of the connecting rod shaft support 16 is hollow and provided with a connecting rod shaft 18, and the connecting rod shaft 18 is sleeved with a stay rod 27. The connecting rod shaft 18 suspends a connecting rod 17 to form a freely swinging structure with a rotating shaft at a top. A middle section of the connecting rod 17 is connected with the piston 6, and a lower end of the connecting rod 17 is fixed with a cam connecting rod contact hammer 26, where the cam connecting rod contact hammer 26 is in contact with a cam mechanism 25 and is driven to swing by the cam mechanism 25. The cam mechanism 25 includes a rolling bearing 21, where an eccentric wheel 24 is placed on the rolling bearing 21, and the eccentric wheel 24 is in contact with the cam connecting rod contact hammer 26. An eccentric shaft support 20 is sleeved on the rolling bearing 21 and the eccentric wheel 24, and the rolling bearing 21 and the eccentric wheel 24 are connected with a spur gear 23 through a rotating shaft 22, and the spur gear 23 is connected with an external controller gear providing signals through a scroll bar 19. The displacement sensor LVDT 29 is connected at a same level as an other side of the middle section of the connecting rod 17 connected to the piston 6. The displacement sensor LVDT 29 includes a pull rod 31, where the pull rod 31 and other internal components are inserted into a fixed component base 32, and an upper end of the fixed component base 32 is connected with a flange 30 and a screw 33.

Figure 5:
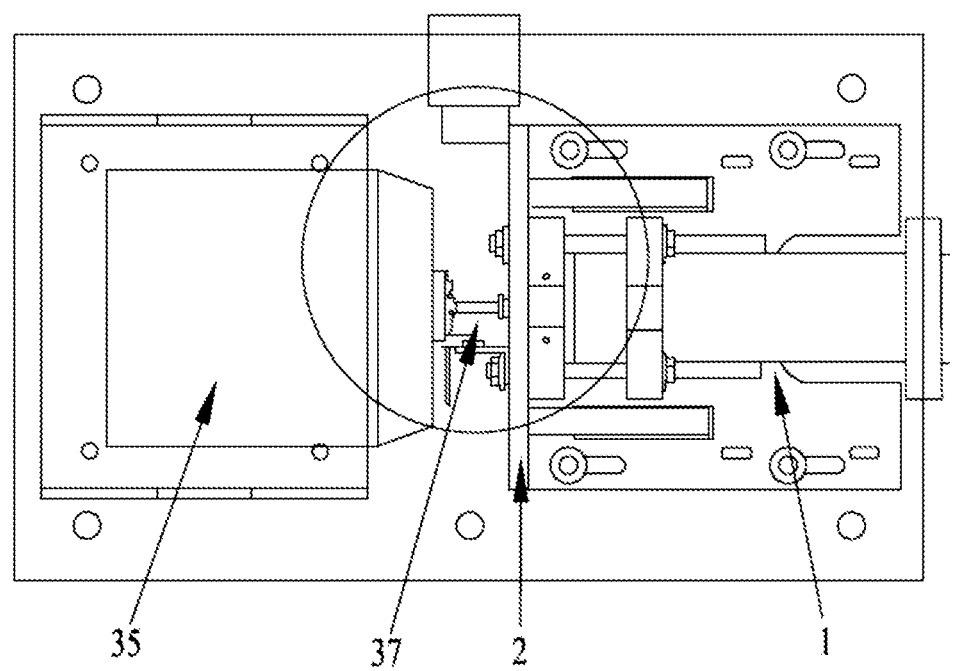
FIG. 5 is a schematic diagram of a top surface of a high-frequency harmonic analysis device according to the disclosure.
Figure 6:
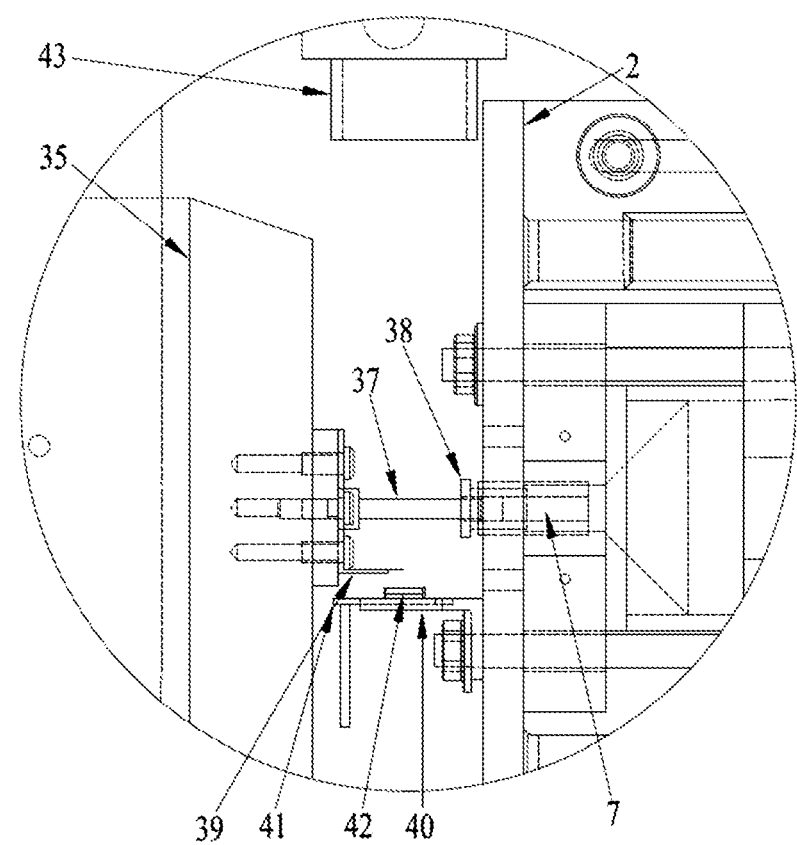
FIG. 6 is an enlarged schematic view of a harmonic analysis component in FIG. 5.
Figure 7:
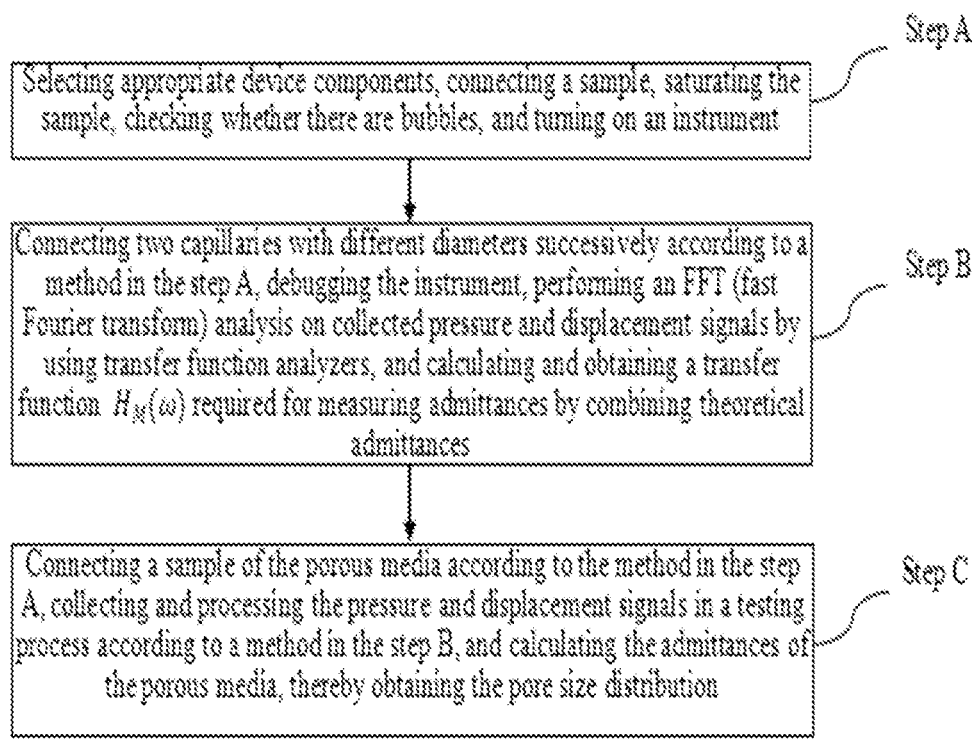
FIG. 7 is a flowchart of a method for measuring pore size distribution of porous media through a harmonic analysis.

With reference to FIG. 5 and FIG. 6, a movable piston 37 is arranged between a vibrating pot 35 and the square bracket 2. The piston 37 is movably fixed on the square bracket 2 and reciprocates under driving of the vibrating pot 35. The piston 37 is connected with the upstream chamber 1 through the adapter 7. An illuminating lamp 43 is installed in a gap between the square bracket 2 and the vibrating pot 35, a photodiode frame 40 opposite to the illuminating lamp 43 is welded on the square bracket 2, a photodiode circuit and the photodiode 42 are arranged on the photodiode frame 40, and the vibrating pot 35 is provided with a shaving blade and a bracket near the photodiode circuit. Movements are detected through this structure.

This test is based on a theory of a parallel capillary model. When a Newtonian fluid passes through a circular tube, an oscillating pressure gradient $\nabla P(t) = \nabla P_0 \cdot e^{j\omega t}$ is applied between an inlet and an outlet. According to a Womersley's momentum diffusion formula of a circular cross-section tube, there is:

$$\tilde{q}_v(\alpha) = \tilde{q}_v(\omega, r) = \frac{\nabla P_0 \cdot \pi r^4}{8\mu} \frac{8}{j\alpha^2} \left[ 1 - \frac{2 J_1(\alpha j^{3/2})}{\alpha j^{3/2} J_0(\alpha j^{3/2})} \right], \quad (1)$$

where $\alpha$ is a ratio of a capillary radius r and a hydrodynamic penetration depth (boundary layer thickness) $\sqrt{v/\omega}$, and $J_1$ is a first order Bessel function of a first kind. A ratio of a flow rate to a pressure gradient is a theoretical admittance of a capillary:

$$g(\alpha) = g(\omega, r) = \frac{8}{j\alpha^2}\left[1 - \frac{2J_1(\alpha j^{3/2})}{\alpha j^{3/2} J_0(\alpha j^{3/2})}\right]. \quad (2)$$

From a relation graph of the admittance and $\alpha$, it may be seen that a modulus and a phase of the admittance depend on the ratio of the capillary radius to the boundary layer thickness. Therefore, using harmonic analysis results to calculate the modulus and a phase diagram of the admittance is enough to calculate a pore radius. A cutoff frequency corresponds to $\alpha=1$, at which point $r=\sqrt{v/\omega}$. Therefore, the smaller a pore size of the porous media to be measured, the more frequency or viscosity needs to be increased for testing. A method of increasing the frequency is used in this embodiment.

An operation method includes following steps, as shown in FIG. 7 and FIGS. 8A-8C.

A, appropriate device components are selected, a sample is connected and saturated, whether there are bubbles is checked, and an instrument is turned on.

B, two capillaries 46a, 46b with different diameters are connected successively according to a method in the step A, the instrument is debugged, pressure and displacement signals of the two capillaries are collected and processed respectively, and a transfer function $H_M(\omega)$ required for measuring admittances is calculated and obtained; and C, a porous sample is connected according to the method in the step A, the pressure and displacement signals of the porous media are collected and processed in a testing process according to a method in the step B, and admittances of the porous media are calculated, so the pore size distribution is obtained.

Specifically, as a preferred embodiment, in the step A, a whole experimental device needs to be filled with a fluid from a joint between the piston and the upstream chamber to an outlet hole before testing. The fluid is preferably pure water or water with 75% glycerol. Glycerol may enhance signals of the pressure sensor. An air fluid may also be used. First, the fluid is injected from the joint between the piston and the upstream chamber, and air existing in the pores is exhausted through the outlet hole. Then, each component is filled by a syringe to ensure that there are no bubbles, and then each component is sealed and connected, and the equipment is turned on.

A minimum pore size determines a maximum frequency required for measurement, and the cam mechanism may only generate low-frequency sinusoidal signals less than 2 Hz, and the signals may be increased to 4 Hz when a harder spring is used, so the cam mechanism is suitable for measuring pores with pore sizes larger than 500 μm. The vibrating pot produces high-frequency sinusoidal signals, so the vibrating pot is suitable for pores with small pore sizes. However, due to a limited measurement frequency range of the pressure sensor, only pores greater than 30 μm may be detected.

According to a sensor linearity test, using the LVDT as the displacement sensor is suitable for low-frequency signals, while using the photodiode as the displacement sensor is more suitable for high-frequency signals.

In this embodiment, whether for calibration or measurement, all equipment need be turned on two hours before use to keep a temperature of electronic components stable.

As a preferred embodiment, in the step B, the displacement sensor and the pressure sensor need to be calibrated before a formal test.

Figure 8A:
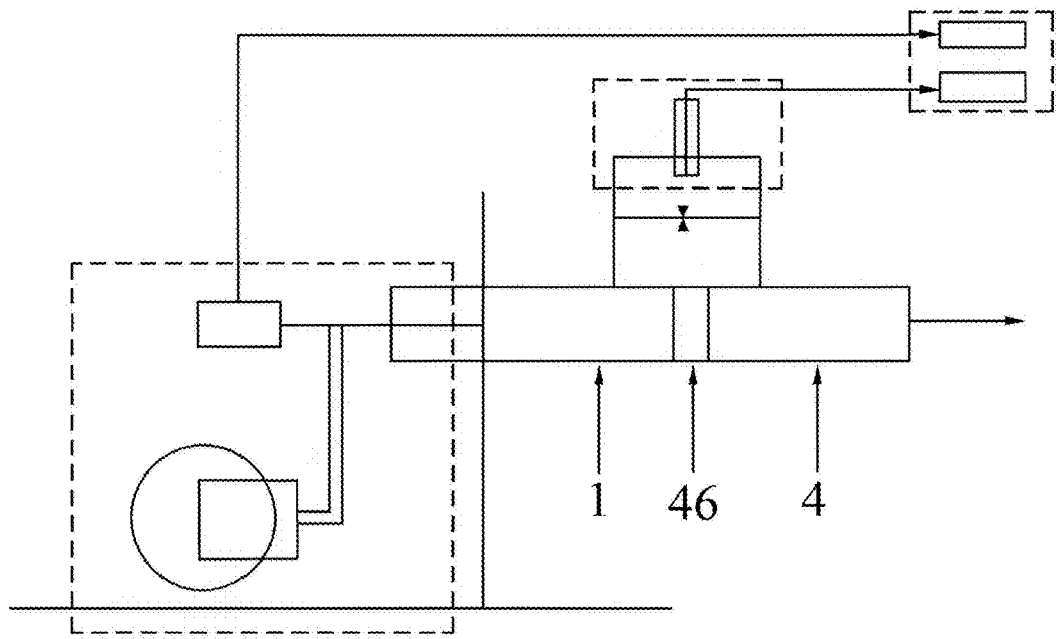
FIG. 8A shows a position of a capillary.
Figure 8B:
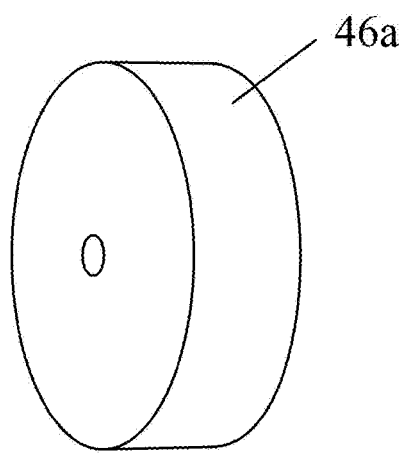
FIGS. 8B and 8C show two capillaries with different diameters.
Figure 8C:
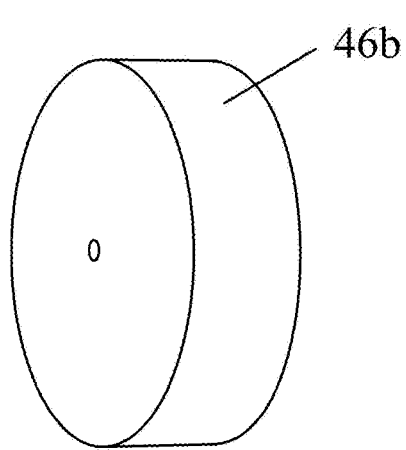

In FIG. 8A, the position of the capillary 46 is shown. In this step, only two capillaries 46a, 46b with diameters of 289 μm and 1895 μm are selected for measurement of pressure and displacement. The displacement sensor LVDT with a transfer function of $h_1(\omega)$ measures an applied displacement with an amplitude of $\tilde{\delta}_x(\omega)$, and the displacement generates a flow rate $\tilde{\delta}_q(\omega)$ with a phase shift of $+\pi/2$. The pressure sensor with a transfer function of $h_3(\omega)$ measures a pressure difference $\tilde{\delta}_p(\omega)$ generated by a fluid passing through the porous media with a flow rate of $\tilde{\delta}_q(\omega)$.

The pressure and displacement signals are collected synchronously by two transfer function analyzers, and 200 continuous frequency signal points from 1 Hz to 500 Hz are collected. Each point is collected for 2 seconds, and then a signal is recorded and integrated for 5 seconds. Here, the harmonic analysis of the displacement and pressure difference signals is performed by fast Fourier transform (FFT).

In an admittance calculation formula:

$$G(\omega) = \frac{h_1(\omega)}{h_3(\omega) \cdot j \cdot \omega \cdot S_{piston}} \cdot \frac{\tilde{\delta}_{U_{\Delta P}}(\omega)}{\tilde{\delta}_{U_x}(\omega)}, \quad (3)$$

where $\dfrac{h_1(\omega)}{h_3(\omega) \cdot j \cdot \omega \cdot S_{piston}}$ is a transfer function for calculating an admittance according to the measured signals, and is denoted as $H_M(\omega)$. By combining theoretical admittances of the two capillaries 46a, 46b with the diameters of 289 μm and 1895 μm and processing results of two groups of pressure and displacement signals, and inverse calculating a frequency response of the transfer function $H_M(\omega)$ according to a formula (3), it may be found that moduli and phases of $H_M(\omega)$ of different capillaries overlap, proving that the transfer function is completely independent of the selected capillaries and depends on system parameters. Therefore, this method may be used to obtain a required $H_M(\omega)$ before measuring the admittance of the porous media each time.

As a preferred embodiment, in the step C, devices for generating and collecting the signals and a signal processing method are the same as in the step B. A sample of porous media is measured, and a modulus and a phase diagram of a total admittance $G(\omega)$ are obtained by substituting the formula (3) according to measured FFT of $\tilde{\delta}_x(\omega)$ and $\tilde{\delta}_p(\omega)$ and the previously obtained $H_M(\omega)$. The admittance of the porous media is a sum of basic admittances, written in a matrix form as:

$$\{G(\omega_i)\} = [g(\omega_i, r_j)] \cdot \{p(r_i) \cdot dr_i\} \{G(\omega_i)\} = [g(\omega_i, r_j)] \cdot \{p(r_i) \cdot dr_i\} \quad (4).$$

By transforming a formula (4), the pore size distribution of the porous media may be obtained:

$$\{p(r_i) \cdot dr_i\} = [g(\omega_i, r_j)]^{-1} \cdot \{G(\omega_i)\} \{p(r_i) \cdot dr_i\} = [g(\omega_i, r_j)]^{-1} \cdot \{G(\omega_i)\} \quad (5),$$

where $[g(\omega_i, r_j)]$ is a matrix of the theoretical admittances of basic capillaries.

If admittance calculation results are noisy, low-order polynomials may be used for fitting, and a horizontal tangent with a modulus of 1 and a phase of 0 may be forcibly fitted near a minimum frequency. If the results are seriously deviated at a high frequency, points with large deviation may be discarded to avoid introducing distortion.

Remaining technical features in this embodiment may be flexibly selected by those skilled in the art according to an actual situation to meet different specific actual needs. However, it is obvious to one of ordinary skill in the art that these specific details are not necessary to practice the disclosure. In other embodiments, in order to avoid confusing the disclosure, well-known composition, structures or components are not specifically described, and are all within a technical protection scope defined by the technical schemes claimed in claims of the disclosure.

What is claimed is:

1. A device for measuring pore size distribution of porous media through a harmonic analysis, comprising:
   a sample and fluid storage container, wherein the sample and fluid storage container comprises an upstream chamber and a downstream chamber, wherein a sample to be tested is placed between the upstream chamber and the downstream chamber, and wherein the upstream chamber and the downstream chamber are respectively connected with two detection ends of a pressure sensor; and
   a harmonic analysis component connected to the upstream chamber, wherein the harmonic analysis component comprises a signal application system and a displacement sensor, and the displacement sensor and the pressure sensor are respectively connected with two independent transfer function analyzers.

2. The device for measuring the pore size distribution of the porous media through the harmonic analysis according to claim 1, wherein a Newtonian fluid is stored in the upstream chamber and the downstream chamber.

3. The device for measuring the pore size distribution of the porous media through the harmonic analysis according to claim 1, wherein the harmonic analysis component comprises a first frequency harmonic analysis component for measuring a first pore size distribution with first pore sizes larger than 500 μm and/or a second frequency harmonic analysis component for measuring a second pore size distribution with second pore sizes larger than 30 μm.

4. The device for measuring the pore size distribution of the porous media through the harmonic analysis according to claim 3, wherein the harmonic analysis component uses a linear variable differential transformer (LVDT) or a photodiode as the displacement sensor, and the LVDT or the photodiode and the pressure sensor are respectively connected with the two independent transfer function analyzers.

5. The device for measuring the pore size distribution of the porous media through the harmonic analysis according to claim 4, wherein the first frequency harmonic analysis component comprises:
   a cam mechanism fixed on a first fixed seat;
   a connecting rod shaft support;
   a connecting rod shaft;
   a connecting rod;
   a first piston;
   a piston guide plate;
   a spring; and
   an adapter,
   wherein the connecting rod is swingably connected on the connecting rod shaft support through the connecting rod shaft arranged at a top of the connecting rod, wherein the cam mechanism is in contact transmission with a bottom of the connecting rod, wherein one side in a middle section of the connecting rod is connected with the first piston and another side of the connecting rod is connected with the LVDT, wherein the first piston is connected with the spring through the piston guide plate, and wherein the spring is connected with the upstream chamber through the adapter.

6. The device for measuring the pore size distribution of the porous media through the harmonic analysis according to claim 4, wherein the second frequency harmonic analysis component comprises:
   a vibrating pot fixed on a second fixed seat;
   a square bracket;
   a second piston;
   an illuminating lamp;
   a photodiode; and
   an adapter,
   wherein one or more of the second piston, the illuminating lamp, the photodiode and the adapter are fixed on the square bracket; wherein the vibrating pot drives the second piston to move, wherein the second piston is connected with the upstream chamber through the adapter, and wherein the illuminating lamp and the photodiode are provided for detecting a movement and a displacement of the second piston.

7. A method for measuring pore size distribution of a porous media through a harmonic analysis, comprising:
   step A, selecting appropriate device components, connecting a first sample, saturating the first sample, checking the first sample for bubbles, and turning on an instrument;
   step B, connecting two capillaries with different diameters successively according to step A, debugging the instrument, performing a fast Fourier transform (FFT) analysis on collected pressure and displacement signals by using transfer function analyzers, and calculating and obtaining a transfer function $H_M(\omega)$ for measuring admittances by combining theoretical admittances; and
   step C, connecting a second sample of the porous media according to step A, collecting and processing pressure and displacement signals in a testing process according to step B, and calculating the admittances of the porous media to obtain the pore size distribution.

8. The method for measuring the pore size distribution of the porous media through the harmonic analysis according to claim 7, wherein in step A, the instrument is filled with a fluid from a position where a piston is connected to an upstream chamber to an outlet hole before the testing process, and different harmonic analysis components are used to measure the pore size distribution of different pore sizes.

9. The method for measuring the pore size distribution of the porous media through the harmonic analysis according to claim 7, wherein step B further comprises:
   (1) connecting the two capillaries with different diameters successively for the testing process, turning on the instrument, and generating a signal by using an actuator and applying an oscillating flow;
   (2) calibrating a sensor;
   (3) collecting the pressure and displacement signals of the two capillaries with different diameters respectively to obtain two groups of pressure and displacement signals, and performing the harmonic analysis on the pressure and displacement signals; and
   (4) substituting analysis results of the two groups of pressure and displacement signals and the theoretical admittances of two measured capillaries into an admittance calculation formula, and inverse calculating the transfer function $H_M(\omega)$ for measuring the admittances of the porous media, wherein the transfer function $H_M(\omega)$ measured by the two capillaries is the same.

10. The method for measuring the pore size distribution of the porous media through the harmonic analysis according to claim 7, wherein step C further comprises:
   (1) connecting the porous media, turning on the instrument, and generating a signal by using an actuator and applying an oscillating flow;
   (2) collecting the pressure and displacement signals of the porous media, and performing the harmonic analysis on the pressure and displacement signals; and
   (3) substituting analysis results of the pressure and displacement signals of the porous media and the transfer function $H_M(\omega)$ measured in step B into an admittance calculation formula to obtain a total admittance of measured porous media, and obtaining the pore size distribution of the porous media according to the total admittance and theoretical admittances of basic capillaries.

* * * * *